United States Patent [19]

Applegate

[11] 4,411,620
[45] Oct. 25, 1983

[54] GRAIN DRIER AND METHOD OF DRYING GRAIN

[75] Inventor: Robert D. Applegate, Attica, Ind.

[73] Assignee: Driall, Inc., Attica, Ind.

[21] Appl. No.: 306,666

[22] Filed: Sep. 29, 1981

[51] Int. Cl.³ .......................... F24H 1/00; F27B 9/04; F26B 17/12
[52] U.S. Cl. ...................................... 432/29; 34/169; 34/174; 432/152; 432/222
[58] Field of Search .................... 432/29, 152, 222; 34/168, 169, 174

[56] References Cited

U.S. PATENT DOCUMENTS

| 3,752,644 | 8/1973 | Arnal | 432/222 |
| 4,097,227 | 6/1978 | Brock | 432/222 |
| 4,242,806 | 1/1981 | McClaren | 34/169 |
| 4,289,481 | 9/1981 | Yano | 34/174 |

Primary Examiner—John J. Camby
Attorney, Agent, or Firm—Luedeka & Neely

[57] ABSTRACT

A grain drier system is disclosed which includes means for collecting heated air which has passed through grain and conducting it to the inlet of the burners which supply the heated gas to dry the grain. The collected air is introduced into the inlet of the burner at the periphery of the air stream to the burner in an area where the contact between the collected air and the flame of the burner is minimized. This procedure enables the heat of the collected air to be utilized without the likelihood of subjecting any entrained material to the action of the flame of the burner.

In order to further minimize the possibility of fire, prior to being conducted to the burner, the collected air is passed into a plenum where the velocity of the stream of collected air is decreased and its direction of movement changed so that a substantial portion of entrained dust and organic material is caused to fall out of the air stream.

Cleanout doors and dump doors for rapid cleaning and unloading of, respectively, the drier are also disclosed.

4 Claims, 9 Drawing Figures

GRAIN DRIER AND METHOD OF DRYING GRAIN

The present invention relates generally to a grain drying and more particularly to a grain drier and method which can reuse heated air which has been passed through grain and can efficiently utilize the residual heat in the grain after drying and which includes various features which cooperate to minimize the damage of fire.

In order to store grain efficiently, it is necessary to dry it to a condition in which it is less subject to molding or other deterioration. This is done by confining the grain between a pair of foraminous members such as screens, perforated plates or the like and passing heated air through the grain which is thus confined. Since is is usually not desirable to store the grain in the heated condition, it is necessary to cool the grain and this is accomplished by passing cool air through the grain mass after it is dried. The cooling process results in a loss of the heat which is in the grain after drying. Because of the high cost of energy, a means to utilize the retained heat would materially decrease the cost of drying.

Heretofore, attempts have been made to utilize the heat in the cooling air after it has passed through the hot grain by reintroducing it into the section of the drier in which the drying occurs. These attempts have been generally unsatisfactory since the air which has passed through the grain mass carries with it dust and organic matter which, when subjected to the heat of the burner which elevates the temperature of the drying air, often results in combustion of the dust and organic materials thus causing fires inside of the drier. Once a fire has been started in a grain mass it is difficult to extinguish and the resulting damage is burned, scorched or smoke damaged grain and the damage to the equipment is substantial.

Accordingly, it is the principal object of this invention to provide a grain drier and method which makes possible the reuse of air after it has passed through the grain mass while minimizing the chance of combustion. It is a further object of the invention to provide a grain drier, which in the event of fire, may be rapidly unloaded so as to minimize the loss of grain and damage to the drier equipment. It is another object of the invention to provide rapid means of removing dust and organic material from the drier during operation so that the build-up of dust and organic material in the drier can be minimized.

Other objects and advantages of the invention will become known from the following description and the accompanying drawings in which.

In general, the method of the invention involves collecting the exhaust air or a substantial part thereof from the cooling section of the drier and conducting it to the inlet of the burners which supply the heated gas to dry the grain. The exhaust air is introduced into the inlet of the burner at the periphery of the air stream to the burner in an area where the contact between the exhaust air and the flame of the burner is minimized. This procedure enables the heat of the exhaust air to be utilized without the likelihood of subjecting any entrained material to the action of the flame of the burner.

In order to further minimize the possibility of fire, prior to being conducted to the burner, the exhaust air is passed into a plenum where the velocity of the stream of exhaust air is decreased and its direction of movement changed so that a substantial portion of entrained dust and organic material is caused to fall out of the air stream. This procedure, in combination with the peripheral introduction of air, is highly effective to minimize combustion of dust and organic material and thus results in a substantial supression of fires.

Figure 1:
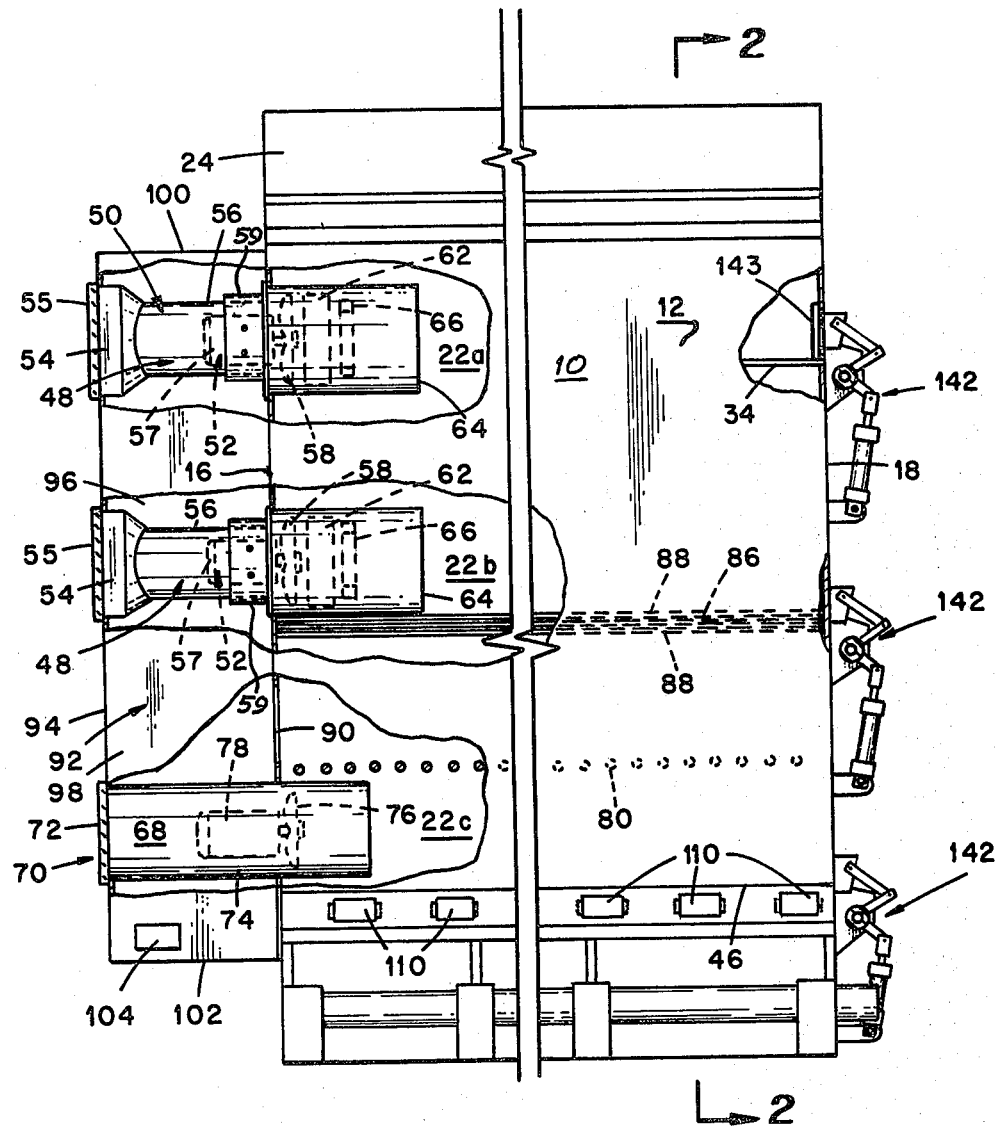
FIG. 1 is an elevational view, partly in section of a drier embodying various of the features of the invention.
Figure 2:
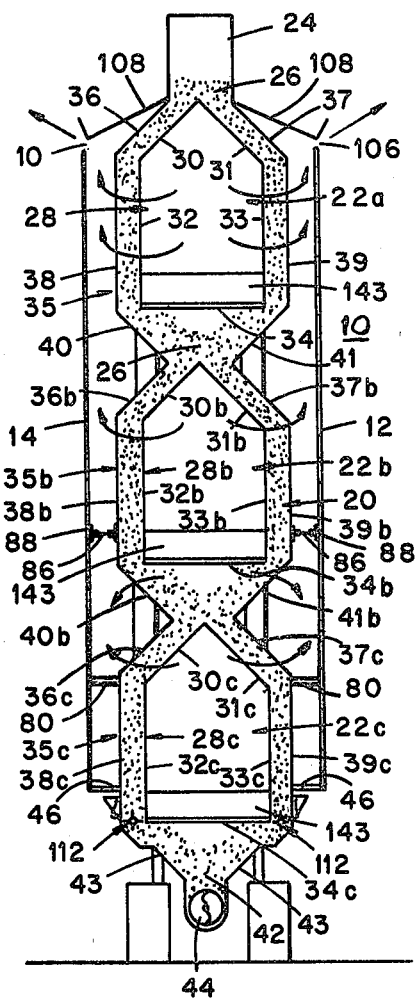
FIG. 2 is a sectional view taken on line 2—2 in FIG. 1.

Now referring to the drawings, FIGS. 1 and 2 illustrate a grain drier 10 embodying various of the features of the invention. The grain drier 10 is of generally box-like construction and includes side walls 12 and 14 and end walls 16 and 18. Inside the walls 12-18 a structure 20 is provided for confining the grain so that it can be subjected to air flow to effect drying and cooling. The structure 20, illustrated, includes three vertically aligned modules 22a, 22b and 22c.

The module 22a, which is the uppermost module, is positioned under a grain distributing trough 24 which extends the length of the drier 10 and into which the grain 26 is distributed. The module 22a includes an inner wall structure 28 comprising a downwardly and outwardly sloping top member fabricated from foraminous members 30 and 31, vertically extending foraminous side members 32 and 33 and a foraminous bottom member 34. The inner wall structure 28 is adapted to receive heated gas (air and products of combustion) under pressure which passes outwardly through the foraminous members 30–33.

The grain 26 is conducted around the inner wall structure 28 by providing an outer wall structure 35. The outer wall structure 35 includes a pair of downwardly and outwardly sloping foraminous members 36 and 37 which are connected at their upper ends to the sides of the distributing trough 24. The lower ends of the members 36, 37, are connected to foraminous side members 38 and 39, respectively. The lower ends of the side members 38 and 39 are connected to downwardly and inwardly sloping, foraminous bottom members 40 and 41, respectively. Thus, the grain 26 moves by gravity from the distributing trough 24 through the space between the inner wall structure 28 and the outer wall structure 35 in a mass having a thickness such that gas from within the inner wall structure 28 can be forced through the wall structures 28 and 35 and the grain contained therebetween.

The module 22b is of the same construction as the module 22a described above and the parts have been given the same reference numerals as those described in connection with module 22a with the addition of a subscript "b". As illustrated, the upper ends of the foraminous member 36b and 37b are connected to the lower ends of foraminous members 40 and 41 of module 22a.

The module 22c is of substantially the same construction as the other two modules 22a and 22b and accordingly, the corresponding parts will be given the same reference numbers followed by the subscript "c" and will not be described except as concerns certain differences in construction which are hereinafter described.

Under the module 22c, the grain is collected in a trough 42 defined by two interconnected sloping side members 43. The grain is conducted out of the trough by means of an auger 44 which runs the length of the drier, accordingly, the module 22c does not include the foraminous members 40, 41. Also, the bottom member 34c is imperforate.

Thus, as will be apparent, the grain 26 from the distributing trough 24 flows around the module 22a, the module 22b, and module 22c into the trough 42 and is conveyed out of the equipment through the auger 44.

In order to provide heat for drying the grain 26, a pair of burner assemblies 48 are provided, one being aligned with the central portion of the module 22a and the other being aligned with the central portion of the module 22b.

Each of the burner assemblies 48 includes an inlet duct 50 which extends from a source of outside air to a fan 52. The inlet duct 50 includes a louvered inlet fitting 54 which is provided with a number of horizontally disposed louvers 55 which are preferably angled upwardly to deflect the sound of the fan and burner upwardly and away from those working in the vicinity of the drier. The inlet fitting 54 is connected to a cylindrical duct 56 which conducts air from the louvered fitting 54 to the fan 52. The fan 52 includes a driving motor 57 or the like which is mounted in the duct 56 and a propeller type fan blade 58 which is of larger diameter than the diameter of the duct 56. The duct 56 and the fan 52 are connected to a fan housing 60 which is of a diameter to accommodate the fan blades 58. The fan housing 60 also includes a plurality of turning vanes 62 which are positioned to cause the air currents generated by the fan to move axially of the center of rotation of the fan blades 58.

Figure 3:
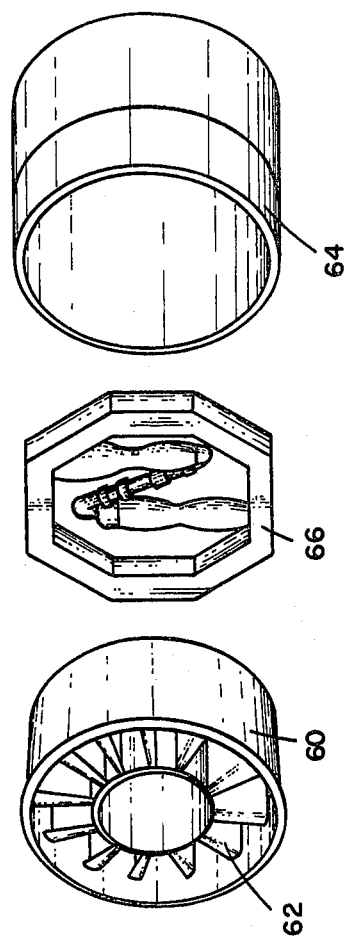
FIG. 3 is an exploded view illustrating the burner and duct construction which constitutes a part of the device shown in FIG. 1.
Figure 3:
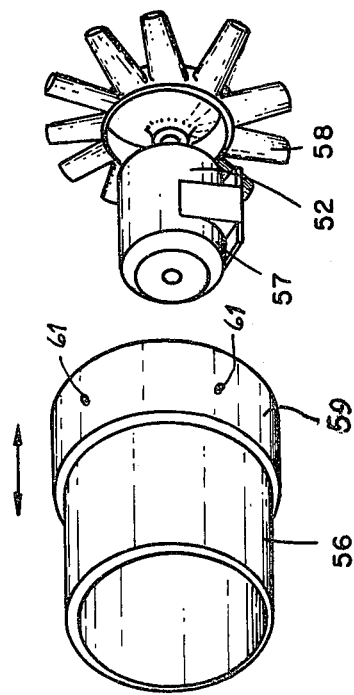

In order to adjust the size of the opening between the duct 56 and the fan housing 60, a cylindrical sleeve 59 is attached to the duct 56 for movement therealong. After the proper position is determined, the sleeve 59 is locked to the duct as by the bolts 61 illustrated (FIG. 3).

The fan housing 60 is connected to a cylindrical burner shroud 64 which contains a flame type burner 66 which is adapted to burn liquid petroleum gas, natural gas or the like. The burner 66 illustrated is of the ring type, but a burner with a deflector which provides a flame with a substantial cross-sectional area also may be employed. The gas and combustion air is conducted to the burner by a conduit (not shown) and is fed through a plurality of holes (not shown) on the side of the burner which is remote from the fan 52. The gas is ignited by ignition means (not shown). The diameter of the ring burner 66 is approximately that of the duct 50 so that there is a circumferential space between the burner 66 and the inner walls of the duct 60.

Each of the burner assemblies 48 is mounted in an opening in the end wall 16 of the drier. As illustrated, one of the burner assemblies 48 is mounted in a position where its fan housing 60 and burner shroud 64 extend into the interior opening defined by the inner wall structure 28 of module 22a. The other burner assembly 48 is mounted in a position where its fan housing 60 and burner shroud 64 extend into the interior of the opening defined by the inner wall structure 28b of module 22b.

Cooling air is supplied to module 22c by means of a fan assembly 68. The fan assembly 68 includes a louvered inlet fitting 70 having louvers 72 which are preferably angled to deflect the sound of the fan upwardly. The inlet fitting 70 is connected to an elongated, cylindrical duct 74 which extends through the wall 16 of the drier and into the interior opening defined by the inner wall structure 28c of the module 22c. The fan assembly 68 includes propeller type fan blades 76 driven by a motor 78. The motor 78 and blades 76 are mounted in the duct 74.

The cooling air after it has passed through the inner wall structure 28c, outer wall structure 35c and the grain contained therebetween, moves upwardly between the walls 12 and 14 and the module 22c and the lower portion of the module 22b where passage of air is blocked by longitudinally extending plates 86. The plates 86 are horizontally disposed and are proportioned to extend between the lower portion of each of the foraminous members 38b and 39b and the side walls 14 and 12, respectively. The plates 86 each extend from the end wall 16 to the end wall 18 so as to cause air from the fan assembly 68 which has passed through the grain to be confined in the space below the plates 86. (The elements 80 are braces to aid in supporting wall structures 12 and 14.)

During operation, dust and organic material will build up on the plates 86 and, in order to permit cleaning, the plates 86 are slidably supported along each side in a slot defined by a pair of opposed angle members 88. In order to clean the upper surface of the plates 86 they are slid outwardly through openings (not shown) in the end wall 18 of the drier.

In order to recycle the air from the space below the plates 86 to the burner assemblies 48, an opening 90 is provided in end wall 16 on each side of the unit through which the air can pass. In addition, a plenum 92 is provided for conducting the air from the opening 90 to the burner assemblies 48. The plenum 92 is defined by an end wall 94 which is parallel to and spaced from the end wall 16 of the drier. The plenum end wall 94 is provided with suitable openings to support the louvered inlets 54 and 70 of the burner assemblies 48 and the fan assembly 68. Vertically extending side walls 96 and 98 interconnect the sides of the end wall 94 of the plenum 92 to the end wall 16 of the drier. The plenum 92 is completed by a top wall 100 and a bottom wall 102. A clean out door 104 is provided in side wall 98 for removal of materials which fall to the bottom of the plenum.

In operation, grain is fed into the distributing trough 24 and fills the space between the inner and outer wall structures of each of the modules 22a, 22b and 22c. The burner assemblies 48 are ignited. Some of the air to be heated to dry the grain is drawn in from outside of plenum 92 through the duct 56. Fan assembly 68 is actuated to draw cooling air into the drier from outside of the plenum 92. The cooling air passes through the inner and outer wall sections 28c and 35c and through the grain contained therebetween. In the process, the air becomes heated. Also, some heated air passes out of module 22b beneath the partition 86. The combined air streams are conducted to the plenum 92 through the openings 90. The action of the air and gas moving outwardly from the module 22c and the lower portion of the module 22b and then towards the opening 90 is at a low velocity and this, coupled with the changes in direction of the air stream, permits dust and organic material to settle out on members 46. In the plenum 92, the air which has entered through opening 90 which is at a relatively high velocity decreases in velocity because of the large volume in the plenum and changes direction, flowing generally upwardly to the burner assemblies 48. The decrease in velocity and the change of direction permits an additional portion of entrained dust and organic material to fall to the bottom of the plenum 92 where it can be periodically removed.

The upwardly moving air passes between the peripheral space between the inlet duct 56 and the fan housing 60 of each of the burner assemblies 48 where it is blown by the fan blades 58, through the turning vane section 62 and through the burner shroud 64 around its periphery. Thus, some of the air to be heated by the burner 66 is supplied from the outside, this air being channeled centrally in the shroud 64 and directed over the burner 66 while the recycled air from the cooling section is directed through the shroud at its periphery to minimize contact with the flame of the burner 66.

In operation, the burner assemblies 48 are adjusted to provide heated air and products of combustion at a temperature which is suitable for the grain being dried. In the case of ordinary corn, the burner in module 22a is adjusted to provide a temperature of about 220° F. while the burner assembly for module 22b is adjusted to provide air at a temperature of about 190°-200° F. When drying popcorn, rice, etc., the temperatures are much lower in accordance with usual practices.

As particularly illustrated in FIG. 2 the heated air from module 22a and the upper portion of module 22 above plates 86 flow upwardly out of the drier through openings 106 controlled by adjustibly positionable doors 108 in the usual manner.

Thus, the cold moist grain is first subjected to the warmest air in module 22a. The treatment in module 22a partially dries the grain and it moves into module 22b where the temperature of the air is slightly reduced to insure that the partially dried grain is not damaged by the heated air and combustion products. Thereafter, the dried, heated grain flows into module 22c and thence to auger 44 which conveys it out of the drier. While in module 22c, ambient air is blown through the grain to cool it and this air which has been heated by the grain is conducted to the plenum 92 where organic material and dust is dropped out and the air is subsequently introduced into the periphery of the burner shrouds. Operation has shown that this reuse of air results in a substantial fuel savings while minimizing the danger of fire which can occur if organic material and dust are passed through the burner flame.

While the danger of fire in the system which has been described is minimal, it is always present in a grain drier. Accordingly, in order to minimize damage to grain and equipment in the event of fire, emergency dump doors 110 are provided along both sides of the drier. The dump doors 110 are spaced apart along the length of the drier on both of its sides and are installed in the lower section of members 38c and 39c just above metering roll assemblies 112 so that the doors 110 serve a dual purpose as will be described.

Figure 4:
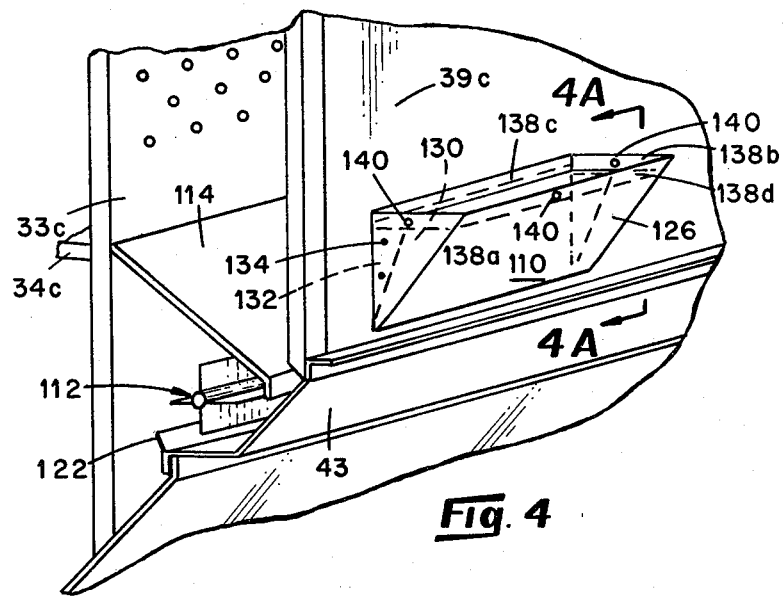
FIG. 4 is a perspective view of the quick opening dumping device which constitutes a part of the grain drier shown in the preceding Figures.
Figure 4A:
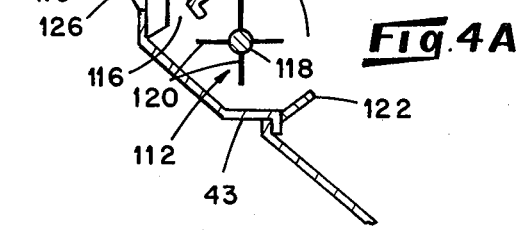
FIG. 4A is a sectional view taken on line 4A—4A in FIG. 4.

The metering roll assemblies 112 are illustrated in FIGS. 4 and 4A and are of generally known construction. The metering roll assemblies 112 are provided to control the flow of grain through the drier to obtain the desired moisture content. If the moisture content of the dried grain is too high, the amount metered through is reduced and, if the moisture content is below that desired, the amount of grain metered through is increased. The metering roll assembly 112 includes a longitudinally extending baffle 114 which extends between the inner wall 33c and the outer wall 39c of the module 22c to provide a slot 116 which reduces the cross section of the grain path between the foraminous members. Between the baffle 114 and the sloping side member 43 there is provided a longitudinally extending shaft 118 which runs the entire length of the drier. The shaft 118 carries a plurality of paddles or blades 120 so that rotation of the shaft 118 and its associated paddles 120 moves the grain from under slot 116 into the hopper 42. In order to minimize uncontrolled flow, a longitudinally extending lip 122 is provided in the sloping side member 43 as illustrated.

Because of the action of the metering roll assembly 112, rapid movement of grain out of the drier is not possible in the event of fire or other emergency. To accomplish such rapid dumping, the doors 110 are provided. Each of the doors 110 includes a pair of triangular end plates 124 which are attached to a rectangular face plate 126 as illustrated. The lower edge of the face plate 126 abuts against the outer wall section 39c. An opening 130 is provided in the wall section 39c whose ends are provided with brackets 132. Pins 134, or the like, are passed through the triangular end plates 124 and their associated bracket 132 so that the door 110 may be engaged to the wall section 39c or released and dropped off to rapidly dump the grain merely by pulling the pins 134.

A top member 136 is provided to close the top of door 110. The top member 136 is preferably removable and in the illustrated embodiment includes upstanding flanges 138a, b, c, and d, flanges 138a and 138b being detachably connected to the end plates 124 as by bolts 140. Thus, in addition to providing a means to dump the grain rapidly from the drier, the top member 136 may be removed with the door 110 in the position shown in FIGS. 4 and 4A to provide access to the metering roll assembly 112. It is thus possible to remove tramp materials which may become lodged in the slot 112 or under the paddles 120 without emptying the grain from the drier.

During operation, dust and organic material tend to accumulate on the plates 34, 34b and 34c and on the inner walls of modules 22a, 22b and 22c. In order to rapidly clean those areas, the end wall 18 is provided with a large opening 141 which is covered with a power operated door assembly 142 which will open and close the opening 141. In the open position, the fans 58 and 76 are operable to rapidly blow foreign material which is in each of the modules out of the opening 141 without a substantial interruption in the operation of the drier.

Figure 5:
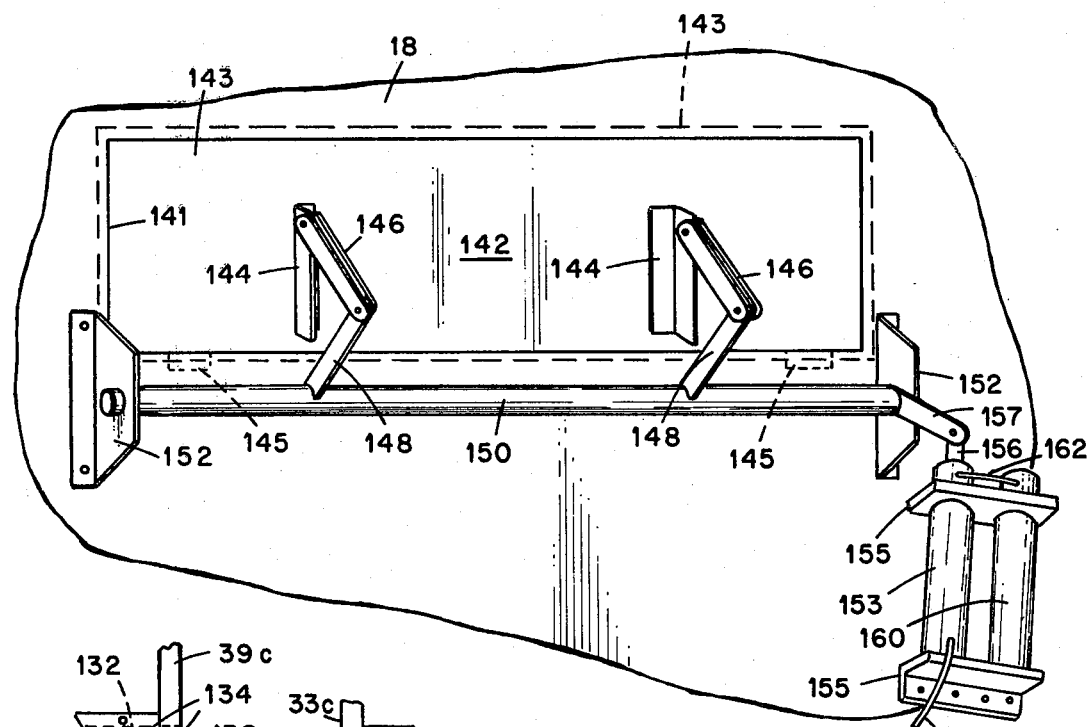
FIG. 5 is a perspective view of the clean-out door construction which forms a part of the drier shown in FIGS. 1-3.

The door assembly 142 is particularly illustrated in FIG. 5. The assembly 142 includes a plate 143 which is proportioned to be larger in each dimension than the opening 141 in the wall 18 as shown by the dotted outline in FIG. 5. The lower edge of plate 141 is hingidly attached to the wall 18 by the hinge members 145 so that it can fold down against its associated bottom member 34. The plate 143 is provided with a pair of spaced apart brackets 144, and to each of the brackets 144 there is hingedly attached one end of a link 146. The other end of each of links 146 is hingedly attached to a crank arm 148 rigidly attached to a shaft 150. The shaft 150 is journalled in brackets 152 which are supported on the end wall 18, the axes of the hinged connections at the ends of links 144 being parallel to the axis of the shaft 150 so that rotation of the shaft 150 causes the plate 143 to move inwardly relative to the opening 141.

Rotation of the shaft 150 is preferably effected by a pneumatically operated cylinder 153 attached to the wall 18 by brackets 155. This is accomplished by connecting the piston rod 156 of the cylinder 153 to a crank arm 157 rigidly attached to the shaft 150. Pressurized air is conducted to the cylinder 153 through conduit 158. Thus, pressurization of the cylinder 153 extends the piston rod 156 and rotates the shaft 150. This causes the plate 143 to swing inwardly against the air pressure within the drier, thus, permitting the fans to blow out accumulated dust and organic material.

As illustrated, an accumulator 160 is mounted on the brackets 155 adjacent the cylinder 153. The accumulator includes a chamber which is connected by a conduit 162 to the pneumatic cylinder 153 to receive the air which is displaced by the piston when the door is opened. The displaced air will be at an elevated pressure and, when operating pressure is released from the cylinder 153, the pressure in the accumulator 160 together with the air pressure from the fan on the plate 143 will cause the plate to rotate about the hinge 145 to the closed position. The closing force may be increased by reducing the volume in the accumulator 160 as by partially filling it with oil or the like.

Figure 6:
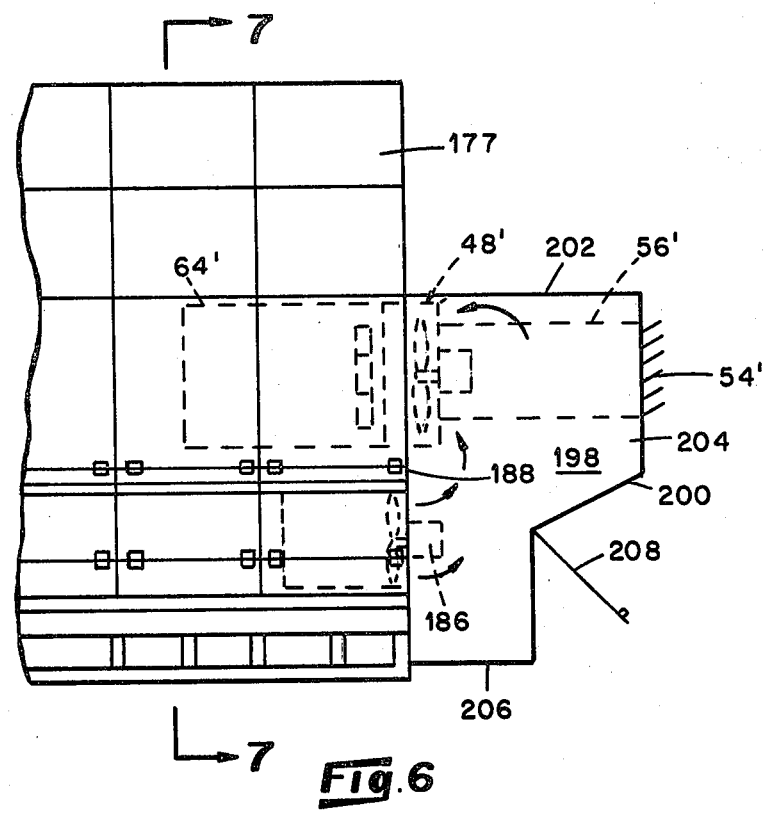
FIG. 6 is an elevational view illustrating the one end of a portable grain drier embodying various features of the invention.
Figure 7:
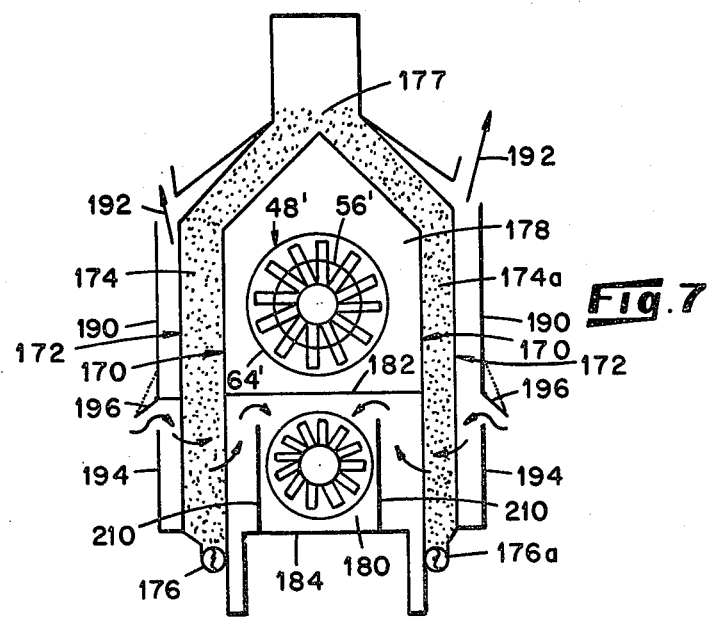
FIG. 7 is a sectional view taken on line 7—7 in FIG. 6.

In FIGS. 6 and 7 there is illustrated a portable drier which embodies various of the features of the invention. The grain to be dried is confined between inner foraminous wall sections 170 and outer foraminous wall sections 172. The grain path, in cross-section (FIG. 7) includes two spaced apart, vertically extending runs 174 and 174a which merge at their upper ends at the distributing trough 177. The lower end of each of the grain paths 174 and 174a is provided with an auger 176 and 176a to effect removal of the dried grain. As in the case of the drier which has previously been described, the upper portion of the grain paths 178 are heated and the lower portion of the grain paths 180 is cooled. These areas are separated by an imperforate partition 182 which extends between the foraminous inner wall sections 170. The bottom of the cooling section 180 is defined by the horizontally extending partition 184.

Heating of the grain is effected by a burner assembly 48' which is identical to the burner assemblies 48 which have been described, the burner shroud 64' extending into the space defined by the upper portions of the inner foraminous sections 170 and the partition 182.

Cooling air is drawn through the grain in the area between the partitions 182 and 184 by a fan 186 mounted in the end wall 188 of the drier. In order that the heated moist air from the heated section is not drawn through the cooling section, weather shields 190 are attached to the outer side of the foraminous members 172 in the heated section of the grain paths 178 to direct the heated air upwardly as shown by the arrows 192.

A weather shield 194 is also provided for the cooling section of the grain paths 180 which includes a control damper 196 for adjusting the amount of air admitted to the cooling section 180.

A plenum 198 is provided for the burner assembly 48' and the fan 186, the plenum being attached to the end wall 188 of the drier. As shown in FIG. 6 the plenum 198 includes an end wall 200 which receives the louvered inlet 54' for the burner assembly 48', a top 202, side members 204 and a bottom 206. The end wall 200 of the plenum is provided with a cleanout door 208 (normally closed during operation) for removing accumulated dirt and organic matter as required.

In order to aid in settling out materials entrained in the cooling air after it has passed through the grain mass, a pair of spaced-apart partitions 210 are disposed in the cooling section. The partitions 210 run the length of the drier and are spaced inwardly of the foraminous wall sections 170. The partions 210 are vertically extending and are supported on the bottom partitions 184.

In operation, the cooling air is drawn through the confined grain by the fan 186 and is caused to move upwardly by the partitions 210 so that the change of direction and the low velocity causes some entrained materials to settle out. The air then passes between the top of partition 210 and bottom partition 182 to fan 186. The air from the fan 186 is discharged into the plenum 198 where the cross-sectional area of the flow path is increased thus decreasing its velocity. Also, its direction is changed, both of which actions cause additional materials to settle out. The air is then drawn between the duct 56' and the housing or shroud 64' where it flows downstream around the periphery of the burner 66, thus, minimizing contact of this air with the direct flame from the burner. Again, the outside air which is drawn through the inlet 54' is channeled through the central area of the shroud 64' part of the burner 66'.

The heated air is forced through the grain mass to effect its drying and then is discharged upwardly by the action of the weather shields.

Figure 8:
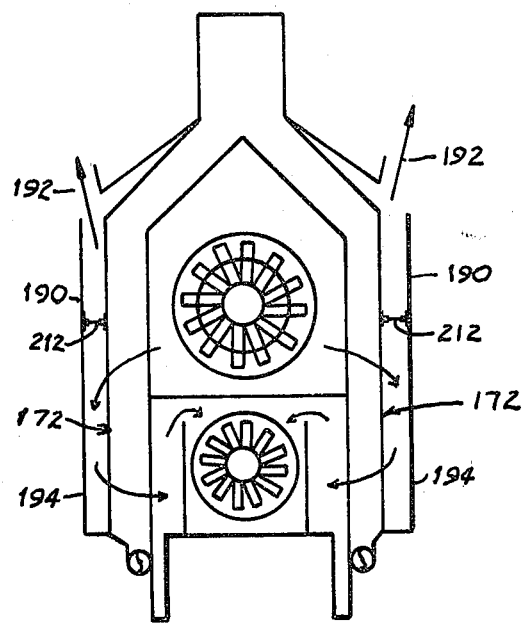
FIG. 8 is a section view of the grain drier of FIGS. 6 and 7 which is modified to discharge heated grain.

FIG. 8 shows another mode of operation for the drier illustrated in FIGS. 6 and 7. In this mode, a portion of the heated air is recycled into the cooling section and the grain is cooled at a location remote from the drier. Such operation increases the drying capability of the drier without greatly increasing fuel consumption.

In this mode, the dampers 196 are closed and a horizontally disposed, longitudinally extending partition 212 is provided on each side of the drier between the weather shields 190 and the outer foraminous wall sections 172. The partition 212 is located above the partition 182 so that a substantial portion of the heated gases from the burner 48' are conducted through the cooling section. Entrained materials are settled out in the manner which has been described. In this mode, the cleanout door 208 is opened and its position adjusted to balance the air in the plenum and to maintain the moisture level in the recirculated gases at a satisfactory level.

Various of the features of the invention which are believed to be new are set forth in the appended claims.

What is claimed is:

1. Apparatus for heating air for drying grain which air includes air which has been passed through grain comprising, a generally cylindrical duct, a propeller type fan having a larger diameter than the diameter of said duct, mounted at one end of said duct for moving ambient air through said duct from its other end, a cylindrical housing for said fan, said housing having a diameter larger than said inlet duct to accommodate said fan, said housing and said inlet duct being aligned in end-to-end relation, an open flame type burner in said housing, said burner being centrally located in said housing and positioned downstream of said fan, said burner being proportioned to provide a peripheral space between said burner and said housing, a plurality of stationary vanes in said housing intermediate said propeller type fan and said burner, said vanes being positioned to cause air currents generated by said fan to move axially through said housing, and means for conducting air which has passed through grain into the space between said inlet duct and said housing.

2. The apparatus of claim 1 wherein said burner is proportioned to occupy a space no larger than the cross-section of said inlet duct.

3. In a grain drier system which includes support means for a body of grain to be dried, said support means including a first section and a second section, heated gas supply means including a burner producing an open flame, a duct communicating with a source of ambient air and a propeller type fan for moving a stream of ambient air through and around said open flame to provide heated gases, means for conducting the heated gases through said body of grain in said first section of said support means to heat said grain, means for moving said heated grain from said first section of said support means into said second section of said support means, and means for conducting ambient air through said grain in said second section of said support means to cool said grain incident to which said ambient air becomes heated and entrains dust and organic materials, the improvement which comprises collecting air which has passes through said grain in said second section of said support means, conducting said collected air to said heated gas supply means, and introducing said collected air only into the outer periphery of the air stream produced by said propeller type fan whereby the flow of collected air is directed around said open flame and contact between said collected air and said open flame is minimized.

4. The system of claim 3 wherein the step of conducting said collected air to said heated gas supply means includes the steps of reducing the velocity of said collected air and changing the direction of motion of said cooled air to remove at least some of said entrained dust and organic materials.

* * * * *